United States Patent
Ojala et al.

Patent Number: 5,421,176
Date of Patent: Jun. 6, 1995

[54] DRUM WASHER

[75] Inventors: Alpo Ojala; Seppo Rosnell; Reima Karke, all of Pori, Finland

[73] Assignee: Sunds Defibrator Pori Oy, Pori, Finland

[21] Appl. No.: 142,336

[22] PCT Filed: Jun. 17, 1992

[86] PCT No.: PCT/FI92/00187
§ 371 Date: Nov. 23, 1993
§ 102(e) Date: Nov. 23, 1993

[87] PCT Pub. No.: WO92/22702
PCT Pub. Date: Dec. 23, 1992

[30] Foreign Application Priority Data

Jun. 17, 1991 [FI] Finland ................... 912920

[51] Int. Cl.[6] .............................. D21C 1/02
[52] U.S. Cl. ...................... 68/43; 68/181 R; 68/158; 210/404; 162/60; 162/329; 162/380
[58] Field of Search ............... 68/43, 181 R, 21, 158; 210/404; 162/60, 329, 380

[56] References Cited

U.S. PATENT DOCUMENTS

| | | | |
|---|---|---|---|
| 3,772,144 | 11/1973 | Luthi et al. | 162/329 X |
| 3,878,698 | 4/1975 | Friksson et al. | 68/43 X |
| 4,085,003 | 4/1978 | Luthi | 68/43 X |
| 4,217,170 | 8/1980 | Luthi | 162/380 |
| 4,266,413 | 5/1981 | Yli-Vakkuri | 68/158 |
| 4,769,986 | 9/1988 | Kokkonen et al. | 162/380 X |
| 4,952,314 | 8/1990 | Henricson et al. | 68/181 R X |
| 5,046,338 | 9/1991 | Luthi | 68/181 R X |

FOREIGN PATENT DOCUMENTS 43112 3/1957 Poland .

Primary Examiner—Frankie L. Stinson
Attorney, Agent, or Firm—Burns, Doane, Swecker & Mathis

[57] ABSTRACT

The invention concerns a drum washer. The washer has two plates (14; 18) located after each other in parallel with the drum, and the pulp to be washed is conducted between these plates. Between the plates there is a gap (22) closed by a flap valve (25) by way of which gap washing liquid is conducted through the mat. The washer is especially suitable for washing cellulose pulp.

20 Claims, 3 Drawing Sheets

DRUM WASHER

PRIOR ART

The invention concerns so-called drum washers, which are used especially for washing pulp suspensions in the cellulose industry.

BACKGROUND OF THE INVENTION

Drum washers have a rotatable cylindrical drum, which is permeable to washing liquid and onto the case of which the pulp to be washed is fed constantly to form a mat. Washing liquid is conducted onto the top of the mat and it then passes through the mat and the case and enters the drum, from which it is removed through the drum end. The washed pulp is worked loose and removed from the periphery.

Drum washers are known wherein a mat is formed on the case and in the lower drum part with the aid of a special compression plate assembly. In this way the washing zone in the drum is lengthened. Such a washer is described e.g. in patent specification FI-C-55370.

GENERAL DESCRIPTION OF THE INVENTION

The purpose of this invention is above all to bring about a drum washer with as long a washing step as possible which works without disturbances.

This purpose is achieved by the apparatus described herein. Advantageous applications of the invention are presented.

DETAILED DESCRIPTION OF THE DRAWING FIGURES

In the following a cellulose pulp washer in accordance with the invention is described as an example.

In the appended drawings

Figure 1:
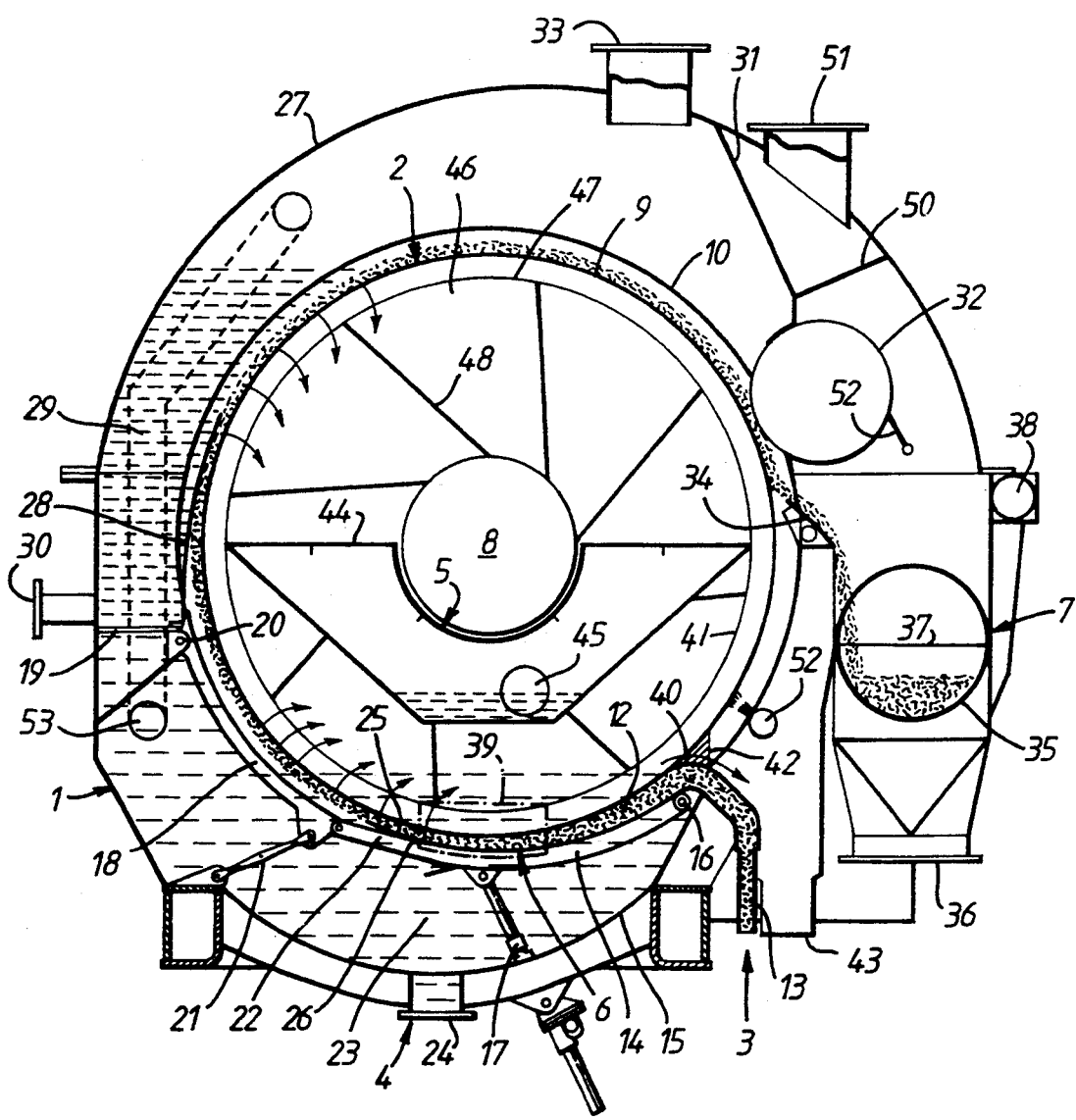
Figure 2:
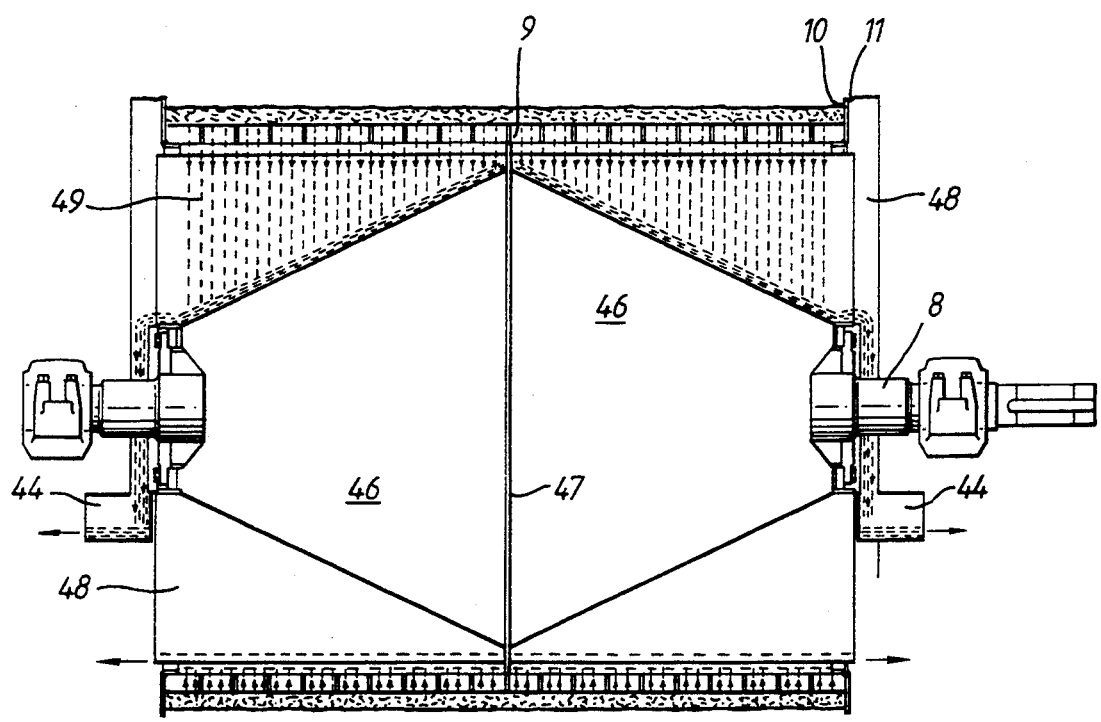
Figure 3A:
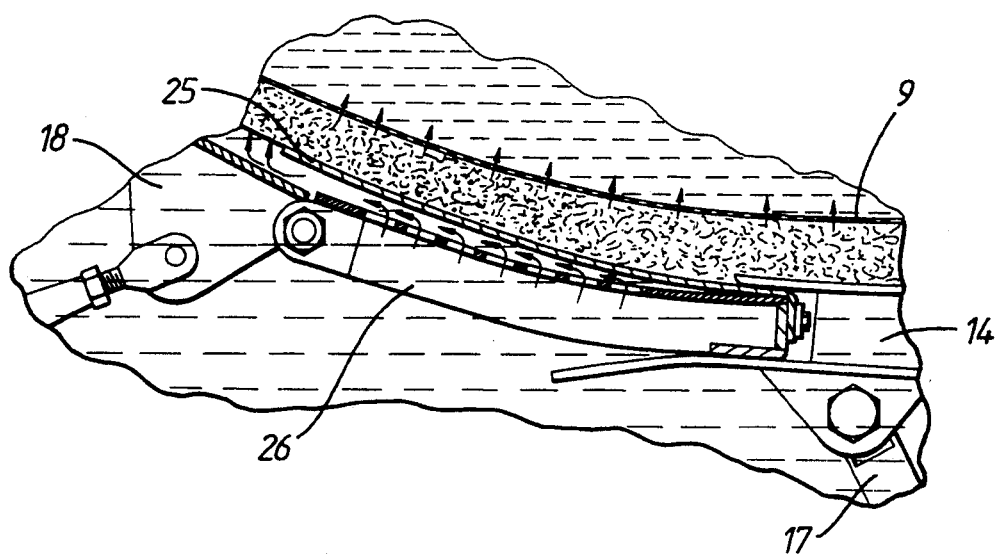
Figure 3B:
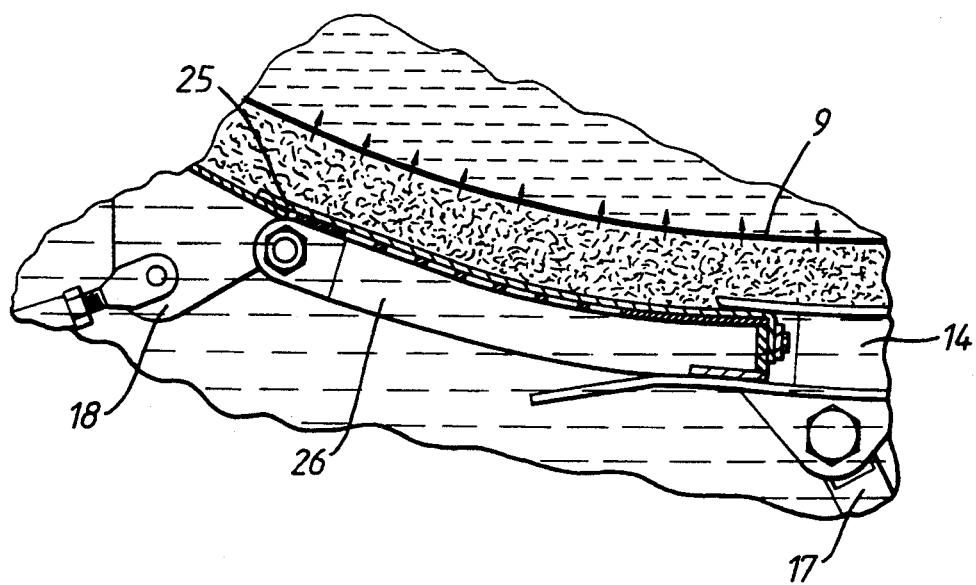

FIG. 1 shows an end view of the washer and of the washing process as seen from one end of the washing drum, FIG. 2 is an axial cross-section of the washer drum, and FIGS. 3a and 3b show an ,enlarged view of a detail of the washer's compression plate assembly as seen from one end of the drum.

DETAILED DESCRIPTION

The main components of the washer are a basin 1 attached to the body which has a rotatable filtering drum 2, a feeding assembly 3 for the pulp to be washed, a washing water feeding assembly 4, a washing water circulation piping 5, an assembly 6 for removing washing water and an assembly 7 for removing washed pulp.

The filtering drum has a cylindrical case 9 permeable to washing water and mounted on the shaft 8. The shaft ends protrude from the open ends of the drum into bearings attached to the body. The drum rotates clockwise as seen in FIG. 1.

The case 9 ends are provided with flanges 10. Their exterior side carries sealing means 11 matching with the basin ends (FIG. 2).

Pulp to be washed is supplied into the basin by way of an assembly 13 to an approximate four-five o'clock position in relation to the axis of rotation.

The pulp flow 12 fed into the basin is guided to form a mat against the drum case 9 by a guiding plate 14 which is parallel with the case. The front end of the guiding plate is journalled tightly in the bottom wall 15 of the basin on a shaft 16 which is coaxial with the drum shaft. The distance between guiding plate and drum periphery is adjustable by using bars 17. A follower plate 18 is located after the guiding plate. Its back end is journalled tightly in a partition wall 19 on a shaft 20. The partition is located in an approximate eight-nine o'clock position in the drum's direction of rotation. The distance between follower plate and drum periphery is adjustable by using bars 21. A gap 22 is left between the plates.

The bottom wall 15 of the basin, the guiding plate 14, the follower plate 18 and the partition 19 form a washing water feeding space 23. Washing water is supplied to this space by way of an assembly 24. The washing water flows through gap 22 onto the pulp mat and further through this and through the drum periphery and enters the drum.

The back edge of guiding plate 14 is extended by a flexible lip 25 which presses on the follower plate 18 from the drum side. The lip functions in gap 22 as a flap valve which prevents pulp from entering the washing water feeding space 23. Below the lip there are lip supporting forks 26, which are articulated to the follower plate. Their free ends are located on top of the guiding plate extension.

A pulp mat compression plate 28 forms an extension to the follower plate 18.

The upper part of the basin is closed tightly by a hood 27.

The bottom wall 15 of the basin, its partition 19 and the hood 27 mark the limits of a second-step washing water feeding box 29. Washing water can be fed into the box through an assembly 30.

In an approximate two–three o'clock position in relation to the drum's direction of rotation there is a partition 31 in the hood and a sealing means 32 which presses against the pulp mat and consists of a roller rotating against the mat. In the space thus formed in the upper part of the chamber a positive pressure (e.g. 0.3 bar) is created by supplying air through an assembly 33. The positive pressure furthers the transfer of washing water through the mat.

After the sealing means 32 there is a mat removal device (scraper) for working loose the mat from the drum and moving it into a chute 35. The pulp is removed from the chute into line 36 by a screw conveyor. The chute may also have pulp mat comminutor means 37, for example, suitable obstacles. Diluting water is also fed into the chute by way of assembly 38.

The filtrate collecting on the drum bottom leaves through an aperture 39 in the basin end.

The top edge of the pulp feeding assembly 13 is sealed against the drum periphery. In this way an overflow area 40 is formed which assists in keeping the filtrate level in the drum at a constant level. The water passing through the drum also cleans the case 9 holes removing any attached fibres. From area 41 above the overflow area air flows through the holes due to the positive pressure in the chamber and this air also cleans out the holes. A cleaning scraper 42 is also provided in front of the overflow area. Any overflow and the fibres ending up in it are removed by way of line 43.

The filtrate obtained from the upper part of the drum in the final washing step is of course .cleaner than the filtrate of the early step. This cleaner filtrate is recovered separately into collecting troughs 44 which are located below the drum shaft ends and from which the filtrate is removed along lines 45.

The drum shaft 8 has two fixed similar circular-based cones 46 which are placed with their bases against one another. A flange 47 extends along their bottom seam and this flange is attached to the drum case 9 by radial support bars so that air is allowed to pass between the case and the flange.

Vanes 48 are attached to the surface of each cone 46. The vanes are essentially triangular. A straight gap is left between the vane and the drum case 9.

The filtrate arriving in the upper part of the drum through the drum case 9 falls onto the vanes 48, along which it runs onto the cone 46 surface and further into a collecting trough 44 located below the shaft 8 end.

The vanes 48 are not located radially, but they are turned slightly backwards in the direction of rotation. In this way that sector is reduced from which filtrate is collected. In the embodiment shown by the figures the collection of filtrate starts approximately 45° before the top vane position.

By changing the tilt angle of the vanes 48, their position in relation to shaft 8, and their shape and size it is possible to adjust the length of the collection sector and the efficiency of collection.

The vanes 48 may be provided with grooves or corrugations 49, which guide the flow toward the cone 46 surface (FIG. 2). The rigidity of the vanes is increased at the same time. Of course, the speed of rotation of the drum must not be allowed to become so high that the centrifugal force would begin making the filtrate run with greater difficulty on the vanes 48. In the described washer, which has a diameter of 2.5 m and a length of 3 m, a suitable speed of rotation is e.g. 0.5–6 revolutions per minute.

The cleaner filtrate collected into troughs 44 may be used, for example, in the same washer as washing water supplied to the first step.

The pressurized air conducted into the hood 27 is taken from the pulp exit side from the pulp screw space limited by partition 31 with the aid of a pump 50 and by way of line 51. In this way a low pressure is created on the exit side to assist in moving the washing water and in working loose the pulp from the case 9.

A cleaning scraper 52 may also be connected with the sealing roller 32.

Cleaning of the case 9 is also furthered after the pulp exit area with the aid of a water jet 52 located in area 41.

The washing water feeding space 23 and the air space in hood 27 are interconnected by a pressure pipe 53. Thus, the positive pressure in the hood is made to affect the feeding space 23 as well. At the same time the pipe functions as a safety device which balances the water pressure in the feeding space 23.

Pressure indicators are connected to the equipment at various points to make possible adjustments of e.g. the pressure and speed of rotation according to their indications.

An advantage of the compression plate arrangement of the invention is that even if the pulp feeding pressure should exceed the washing water feeding pressure (e.g. when starting up), the water will be filtrated from the pulp mat into the drum. Thus, the device can be used even if no washing water is fed to the first step.

What is claimed is:

1. A drum washer for washing with liquid a suspension containing solid particles, comprising:
    a cylindrical drum with a case permeable to washing liquid but impermeable to particles to be washed, the drum having an end plate with an aperture;
    a shaft on which the drum is mounted;
    a basin in which the drum is located for rotation;
    an assembly for conducting a suspension of solid particles to be washed to form a particle mat on the drum case, the assembly having two plates located after each other in a direction of rotation of the drum, in parallel with the drum and at a distance from the drum case, the suspension to be washed being conducted between a first of the plates and the drum case;
    an assembly for conducting washing liquid through the particle mat and into the drum through a gap arranged coaxially with the drum shaft between the plates, a flap valve being disposed in the gap to allow washing liquid from the gap between the plates but to prevent pulp from leaving the gap between the plates, and including a washing liquid feeding space, from which washing liquid is conducted through the gap;
    an assembly for removing washing liquid from inside the drum; and
    an assembly for removing washed pulp from the drum.

2. A drum washer as defined in claim 1, wherein the assembly for conducting washing liquid into the drum also has a second-step washing liquid feeding box disposed in the direction of rotation of the drum after the washing liquid feeding space.

3. A drum washer as defined in claim 2, wherein the basin is closed and case edges of the drum are sealed against the basin wall.

4. A drum washer as defined in claim 3, further comprising an assembly for creating a positive pressure in an air space above the second-step washing liquid feeding box.

5. A drum washer as defined in claim 4, wherein the air space above the second-step washing liquid feeding box and the washing liquid feeding space are interconnected by a pipe.

6. A drum washer as defined in claim 3, wherein the assembly for removing washing liquid from inside the drum comprises an for removing washing liquid from the drum bottom and an assembly for separately removing washing liquid obtained from an upper part of the drum in a final washing step.

7. A drum washer as defined in claim 3, wherein the shaft has two cones connected to one another with their bases against each other.

8. A drum washer as defined in claim 3, wherein the assembly for removing washed pulp from the drum has a chute and a screw conveyor inside this as well as pulp mat comminutor means.

9. A drum washer as defined in claim 2, wherein the basin is closed and case edges of the drum are sealed against the basin wall.

10. A drum washer as defined in claim 9, further comprising an assembly for creating a positive pressure in an air space above the second-step washing liquid feeding box.

11. A drum washer as defined in claim 2, wherein the assembly for removing washing liquid from inside the drum comprises an assembly for removing washing liquid from the drum bottom and an assembly for separately removing washing liquid obtained from an upper part of the drum in a final washing step.

12. A drum washer as defined in claim 2, wherein the shaft has two cones connected to one another with their bases against each other.

13. A drum washer as defined in claim 2, wherein the assembly for removing washed pulp from the drum has a chute and a screw conveyor inside this as well as pulp mat comminutor means.

14. A drum washer as defined in claim 2, wherein before the first plate there is an overflow area for filtrate collected within the drum from which the filtrate can leave through the case holes.

15. A drum washer as defined in claim 1, wherein the assembly for removing washing liquid from inside the drum comprises an assembly for removing washing liquid from the drum bottom and an assembly for separately removing washing liquid obtained from an upper part of the drum in a final washing step.

16. A drum washer as defined in claim 1, wherein the shaft has two cones connected to one another with their bases against each other.

17. A drum washer as defined in claim 16, wherein the assembly for removing washing liquid obtained in the final step comprises vanes located on the shaft cone surface and a collecting trough located at the cone end below the shaft, so that the washing liquid running along the vanes and cone surface will fall into the collecting trough.

18. A drum washer as defined in claim 1, wherein the assembly for removing washed pulp from the drum has a chute and a screw conveyor inside this as well as pulp mat comminutor means.

19. A drum washer as defined in claim 1, wherein before the first plate there is an overflow area for filtrate collected within the drum from which the filtrate can leave through the case holes.

20. A drum washer as defined in claim 1, wherein after the pulp exit area there is a water jet for cleaning the case.

* * * * *